United States Patent [19]
Chen

[11] Patent Number: 6,104,785
[45] Date of Patent: Aug. 15, 2000

[54] SUBSCRIBER CONTROL UNIT FOR UNITED HOME SECURITY SYSTEM

[75] Inventor: Scanner Chen, Taipei, Taiwan

[73] Assignee: Tempa Communication Inc., Taipei, Taiwan

[21] Appl. No.: 09/233,933

[22] Filed: Jan. 20, 1999

[51] Int. Cl.[7] .................................................. H04M 11/04
[52] U.S. Cl. ............................................ 379/49; 379/40
[58] Field of Search ........................................ 379/37–51

[56] References Cited

U.S. PATENT DOCUMENTS

| | | | |
|---|---|---|---|
| 4,361,832 | 11/1982 | Cole | 379/49 |
| 5,134,644 | 7/1992 | Garton et al. | 379/39 |

*Primary Examiner*—Wing F. Chan
*Attorney, Agent, or Firm*—Dougherty & Troxell

[57] ABSTRACT

A subscriber control circuit adapted to be incorporated in an united home security system is disclosed. The control circuit includes a plurality of client-side monitor/control servers, each serving to detect and control the situation at the subscriber and connected to a remote administrating and monitoring device via a public telephone network. The remote administrating and monitoring device is capable of transmitting alarm signal to an alarm transmitting network. The client-side monitor/control server also includes a central processing unit, a radio frequency receiver for receiving a detection signal from wireless sensing elements and an encoder for receiving and processing a detection signal from cabled sensing element. A DTMF based receiver connects the central processing unit to the remote administrating and monitoring device to receive a DTMF signal transmitted through the telephone line and transmit the received DTMF signal to the central processing unit. A dialer circuit is coupled to the central processing unit for performing automatic dialing operation.

8 Claims, 3 Drawing Sheets

SUBSCRIBER CONTROL UNIT FOR UNITED HOME SECURITY SYSTEM

1. FIELD OF THE INVENTION

The present invention relates generally to a control unit of a security facility and in particular to the control unit of a security system adapted to be mounted at the subscriber and in communication with a remote administrating and monitoring device.

2. BACKGROUND OF THE INVENTION

In most home security systems, sensing elements and/or alarm generation elements are arranged at suitable positions inside and/or outside the house which are connected to a client-side monitor/control server which is in turn in communication with a remote monitor/control center by means of exclusive cable network so that events occurring in the house may be transmitted to the remote center. An integrated or united home security system comprises a plurality of houses, individually monitored by their own sensing elements and having their own control unit and alarm devices, the control unit being connected to for example a police station or a community watch team by means of the exclusive cable network. Such a system has a disadvantage that a fault alarm in any one of the houses may be transmitted to the whole system which may in turn activate the alarm devices of all the houses connected to the system. In the worst situation, the whole system may be completely out of order and has to be shut down.

Furthermore, the conventional home security system provides only transmission of detection result to for example the police station and remote monitoring, remote control, real time apprising and group apprising are in general not available in the conventional home security system.

Thus, it is desirable to a provide an integrated home security system which overcomes the problems encountered in the prior art home security system.

SUMMARY OF THE INVENTION

Therefore an object of the present invention is to provide an integrated home security system which comprises a processor-based client-side monitor/control server coupled to a remote administrating and monitoring device by means of a pubic telecom-network, the client-side monitor/control server being capable of performing automatic dialing operation for selectively connecting to the remote administrating and monitoring device so as to avoid the need of providing and managing the exclusive cable network and reduce the risk of the undesired fault alarm.

Another object of the present invention is to provide a home security system in which a processor-based host control is incorporated and arranged in the subscriber and coupled to a remote administrating and monitoring device to be controlled thereby for providing the functions of remote monitoring, remote control, real time appraising, and group appraising.

To achieve the above objects, in accordance with the present invention, there is provided a client-side monitor/control server circuit adapted to be incorporated in an integrated home security system which includes a plurality of subscriber's houses or client-sides to be protected thereby each having a client-side monitor/control server associated therewith, the client-side monitor/control server serving to detect and control the situation at the subscriber, which is provided with automatic dialing function for selectively connecting to a remote administrating and monitoring device via a public telecom-network so as to transmit detection result to the remote administrating and monitoring device and to receive a control signal from the remote administrating and monitoring device which is generated in response to the detection result, the control signal being used to activate associated facility at the subscriber. The remote administrating and monitoring device also transmits an alarm signal to an appraising network which may be in connection with for example police station to ask for emergency help.

In accordance with an embodiment of the present invention, the client-side monitor/control server comprises a radio frequency (RF) receiver for receiving a detection signal from wireless sensing elements; an encoder for receiving and processing a detection signal from cabled sensing element; a central processing unit which receives the detection signal from the wireless sensing element and/or the cabled sensing element, the central processing unit having a memory for temporarily storing data and software to be executed in the central processing unit; a dual tone multi-frequency (DTMF) based receiver which is coupled to a subscriber telephone line of a public telecom-network for receiving a DTMF signal transmitted through the telephone line and transmitting the received DTMF signal to the central processing unit; a dialer circuit which is coupled to the central processing unit to be controlled thereby for performing automatic dialing operation in order to connect the client-side monitor/control server to the remote administrating and monitoring device via the subscriber telephone line of the public telecom-network; and a control mode selection circuit which is controlled by the central processing unit in response to the DTMF signal received through the telephone line so as to activate associated emergency handling/communication device to perform a desired emergency handling operation.

Thus, in the architecture of home security system provided by the present invention, an emergency event occurring in any one of the subscriber's houses may be immediately transmitted to all associated personnel, such as police station, community watch team, and the emergency may thus be properly and timely taken care of.

To further understand the present invention, reference is made to the following detailed description of a preferred embodiment of the present invention, as well as the attached drawings, wherein:

BRIEF DESCRIPTION OF THE PREFERRED EMBODIMENT

DETAILED DESCRIPTION OF THE PREFERRED EMBODIMENT

Figure 1:
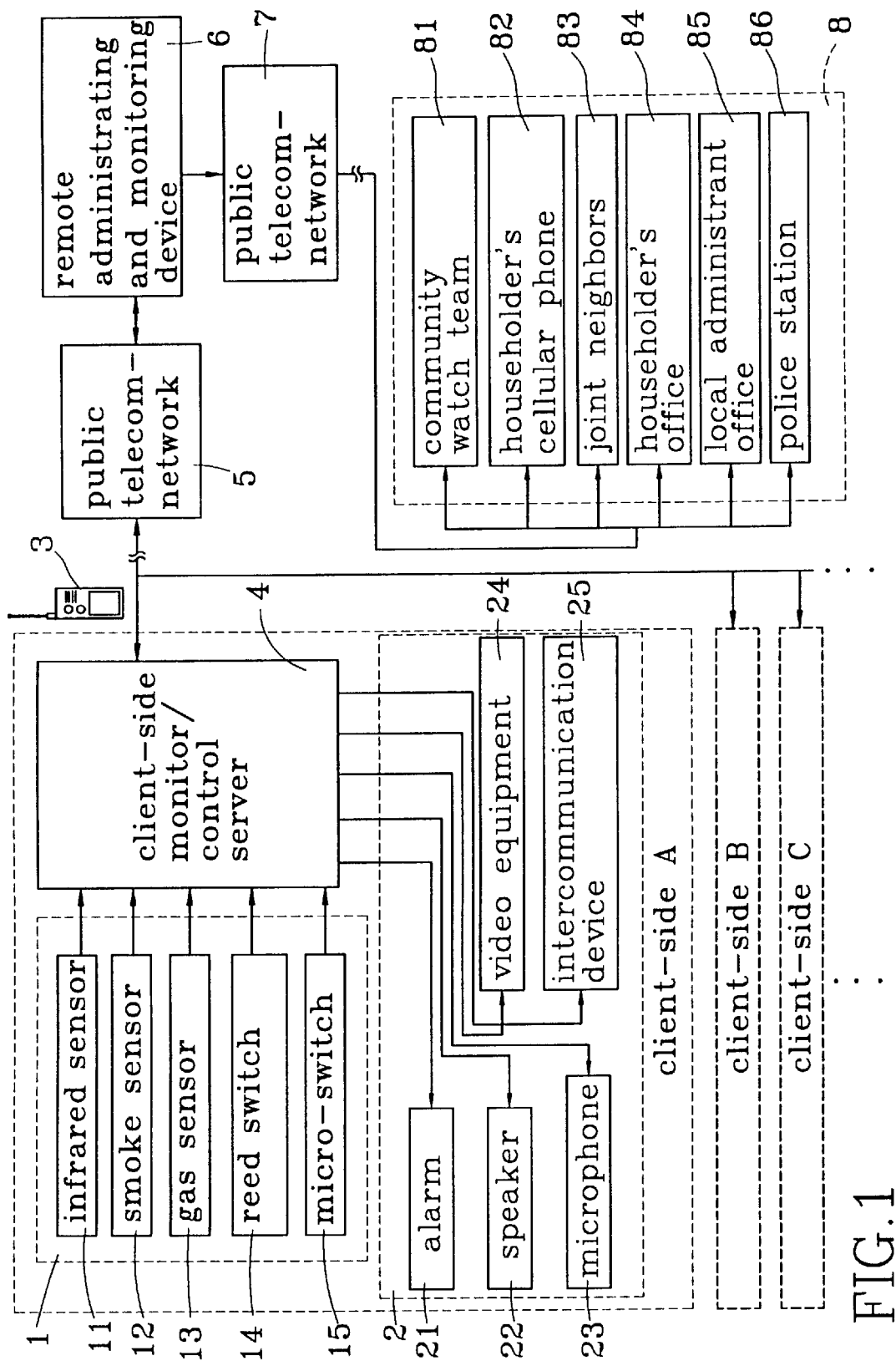
FIG. 1 is a schematic block diagram showing an integrated home security system in accordance with the present invention.

With reference to the drawings and in particular to FIG. 1, wherein an integrated home security system incorporating a subscriber control circuit in accordance with the present invention is shown, the integrated home security system comprises a plurality of subscriber's houses, such as client-sides A, B, C and so on, connected thereto, each having a subscriber security device therein. The subscriber security device comprises a sensing circuit 1, a subscriber emergency handling/communication circuit 2, a remote setting unit 3, and a client-side monitor/control server 4. The client-side monitor/control server of each of the user's houses is connected to a pubic telecommunication network 5.

The home security system of the present invention comprises a remote administrating and monitoring device 6 which is connected to the client-side monitor/control server 4 via the public telecom-network 5. The home security system also comprises an alarm transmitting network 8 which is also connected to the remote administrating and monitoring device 6 via a public telecom-network 7 for establishing and performing data and signal transmission between the client-side monitor/control server 4 and the alarm transmitting network 8. Preferably, the communication or transmission of data and signal between the client-side monitor/control server 4 and the alarm transmitting network 8 is done on the basis of dual tone multi-frequency (DTMF) coding, which is well known to those skilled in the art of telecommunication.

As shown in FIG. 1, the sensing circuit 1 that is coupled to the client-side monitor/control server 4 may comprise any suitable sensor, such as infrared sensor 11, smoke sensor 12, gas sensor 13, reed switch 14 and micro-switch 15. These sensing elements may be arranged at suitable locations based on their performance, such as door, window, passage, and kitchen to detect emergency conditions. The detection of these sensing elements provides a detection signal to the client-side monitor/control server 4 in either cabled way or wireless fashion. The client-side monitor/control server 4 then transmits the detection/alarm signal to the remote administrating and monitoring device 6 via public telecom-network 5.

The subscriber emergency handling/communication circuit 2 is coupled to the client-side monitor/control server 4 to be controlled thereby or by the remote administrating and monitoring device 6 via the client-side monitor/control server 4 to give off alarm or warning signal to residents in the client-sides A, B or C or perform an emergency handling operation, such as in a fire, or provide a bi-directional communication between the subscriber and the remote administrating and monitoring device 6. For these purposes, the emergency handling/communication circuit 2 may comprise an alarm 21, a speaker 22, a microphone 23, a video equipment 24 and an intercommunication device 25.

The remote setting unit 3 provides the user with a measure to set or release the operation of the client-side monitor/control server 4 in a remote control manner.

When the client-side monitor/control server 4 receives a detection signal from any of the previously mentioned sensing elements, the client-side monitor/control server 4 forwards the detection signal, via the public telecom-network 5, to the remote administrating and monitoring device 6 which receives and interprets the detection signal and then, in response thereto, generates and transmits an alarm through the alarm transmitting network 8 to for example the police station or fire station. The alarm transmitting network 8 may comprise communication or alarm device carried by and mounted in for example community watch team 81, householder's cellular phone 82, joint neighbors 83, householder's office 84, local administrant office 85, and police station 86.

Figure 2:
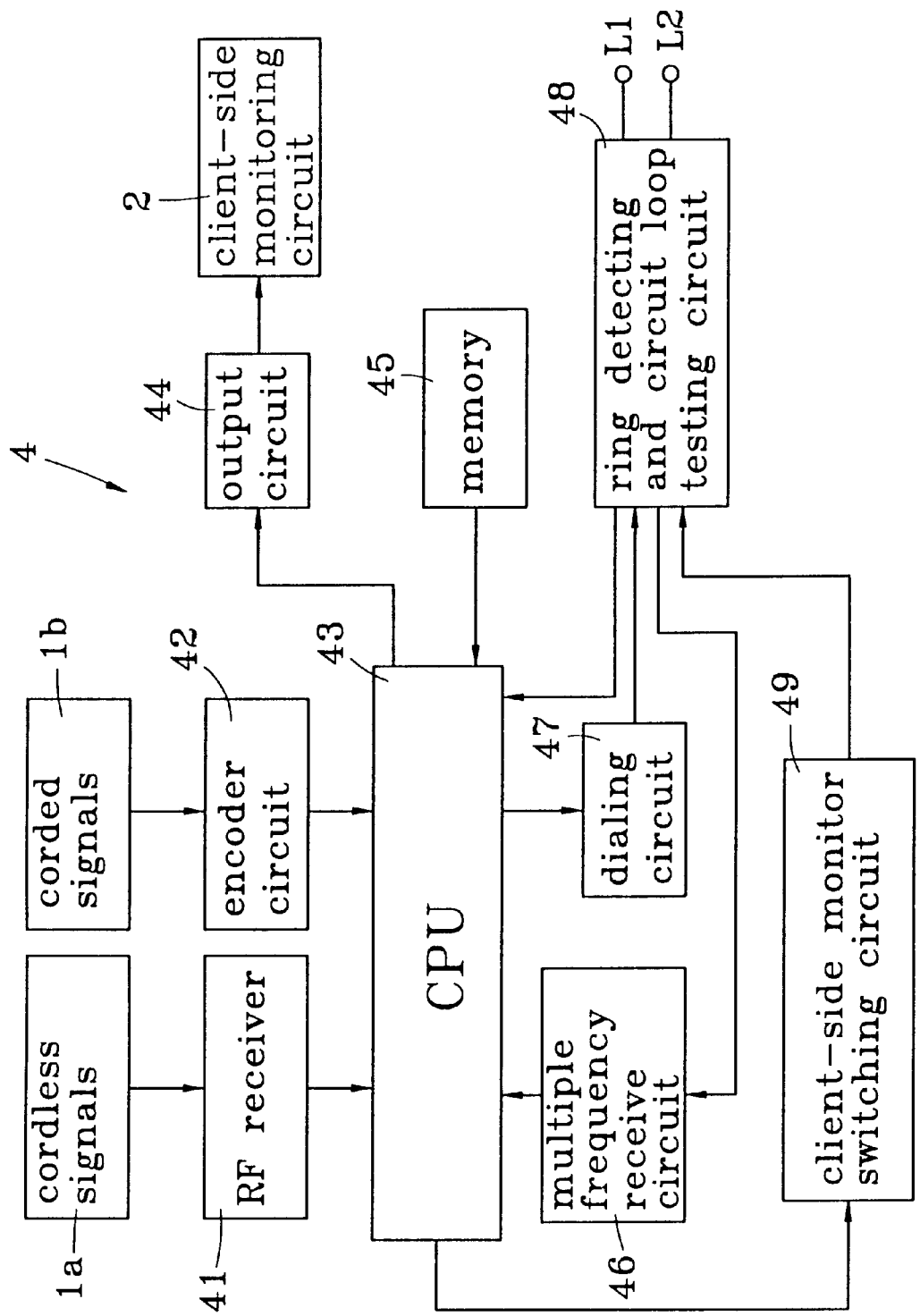
FIG. 2 is a block diagram of the client-side monitor/control server in accordance with the present invention.

FIG. 2 shows, in block form, an example circuit diagram of the client-side monitor/control server 4 illustrated in FIG. 1. The circuit of the client-side monitor/control server 4, which will be referred to as the subscriber circuit, comprises a radio frequency (RF) receiver 41, an encoder 42, a central processing unit 43, an output circuit 44, a memory 45, a DTMF receiver 46, a dialer 47, a ring detecting and circuit loop testing circuit 48 and a control mode selection circuit 49.

The client-side monitor/control server 4 is capable of receiving the detection signal generated by the sensing elements 11–15 at the subscriber and transmitting the received detection signal to the remote administrating and monitoring device 6 via the public telecom-network 5. The remote administrating and monitoring device 6 receives and interprets the detection signal from the client-side monitor/control server 4 and then issues a proper control signal, via the public telecom-network 5, to the client-side monitor/control server 4 which in turn sends corresponding signals to the subscriber emergency handling/communication circuit 2 to activate the emergency handling facility or communication facility thereof in order take control of the user side from the remote unit 6.

Figure 3:
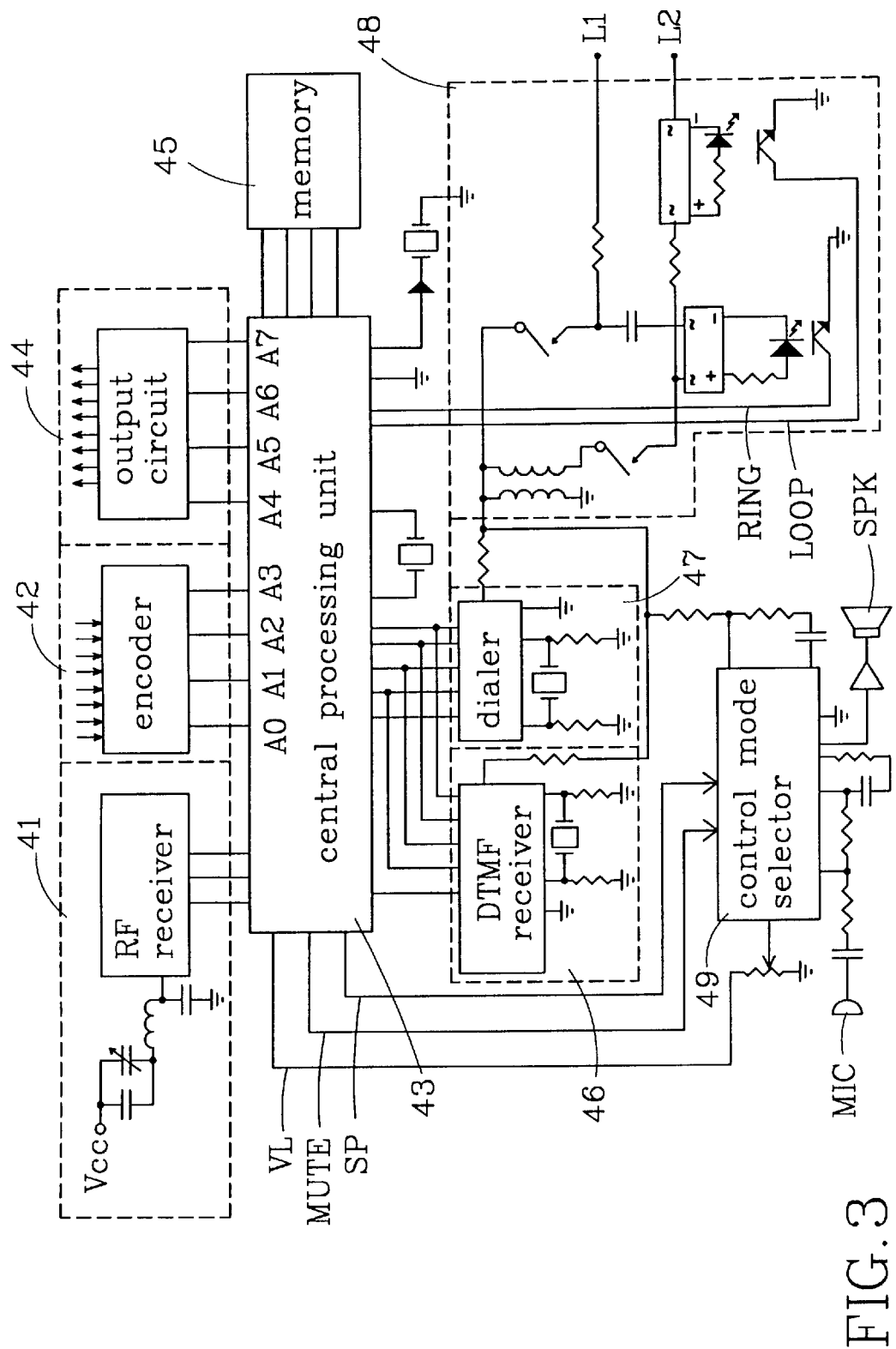
FIG. 3 is an example circuit diagram of the client-side monitor/control server circuit of the present invention.

FIGS. 3 shows a detailed circuit diagram of the client-side monitor/control server 4 in a preferred embodiment of the present invention. The RF receiver 41 receives, in a wireless fashion, a detection signal 1a from the wireless sensing elements among the sensing elements 11–15 of the sensing circuit 1 that is coupled to the client-side monitor/control server 4 or a signal from remote setting device 3 for remotely controlling the client-side monitor/control server 4. The signal 1a is processed and then transmitted to the central processing unit 43. Alternately, the central processing unit 43 may receive a detection signal 1b from the encoder 42 connected to address port A0-A3 of the central processing unit 43. The encoder 42 is coupled to the cabled sensing elements among the sensing elements 11–15 of the sensing circuit 1 to receive the detection signal 1b therefrom and processes the signal to generate a corresponding BCD code which is then transmitted to the central processing unit 43.

The central processing unit 43 operates to control the client-side monitor/control server 4 wherein the output circuit 44 connected to address port A4-A7 of the central processing unit 43 performs a decoding operation to generate an output signal corresponding to the received signal 1a or 1b. Thus, the output circuit 44, when receiving the signal from the central processing unit 43, generates the output signal to drive an associated emergency handling device included in the emergency handling/communication circuit 2, such as a water sprinkler for fire extinguishing or generating an alarm by means of the ring alarm 21.

The memory 45 may be any electrically re-writable memory, preferably an electrically erasable programmable read only memory (EEPROM), serving as a data storage of the central processing unit 43. Software that is to be executed in the central processing unit 43 may also be loaded in the memory 45 first so that the central processing unit 43 may operate properly based on the software.

The DTMF receiver 46 receives DTMF signal transmitted through a subscriber telephone line via the ring detecting and circuit loop testing circuit 48 and decodes the received DTMF signal and then applies the decoded signal to the central processing unit 43 which in response thereto controls the output or turns on/off the telephone circuit.

The dialer 47 is directly controlled by the central processing unit 43 to perform automatic dialing operation to connect the client-side monitor/control server 4 to the remote administrating and monitoring device is 6 so as to establish communication between the client-side monitor/ control server 4 and the remote administrating and monitoring device 6.

The ring detecting and circuit loop testing circuit 48 is directly coupled to telephone subscriber lines L1 and L2 which constitute partly the public telecom-network 5 to detect ringing signal transmitted through the public telecom-network 5 from for example the remote administrating and monitoring device 6. When the ring detecting and circuit loop testing circuit 48 detects/receives a ringing signal transmitted through the subscribers lines L1 and L2, the ring detecting and circuit loop testing circuit 48 provides a corresponding signal to the central processing unit 43 via a first signal line RING and when the ring detecting and circuit loop testing circuit 48 checks and determines that the telephone line is operating normally, the ring detecting and circuit loop testing circuit 48 provides a corresponding signal to the central processing unit 43 via a second signal line LOOP.

The control mode selection circuit 49 is controlled by the central processing unit 43 to selectively activate the emergency handling devices and communication devices included in the emergency handling/communication circuit 2 for performing for example emergency recording (audio and/or visual), alarm generation via for example alarm ring 21 or speaker 22, muting of the speaker 22 or intercommunicating between the subscriber and the remote administrating and monitoring device 6 via the video equipment 24 and/or the intercommunication device 25. The control mode selection circuit 49 may be any known technique that is used in for example telephone system to switch between different lines that connect to different devices.

As shown in FIG. 3, in the embodiment illustrated, the control mode selection circuit 49 comprises a microphone MIC corresponding to the microphone 23 of the emergency handling/communication circuit 2 shown in FIG. 1 and a speaker SPK corresponding to the speaker 22 of the emergency handling/communication circuit 2 shown in FIG. 1 to serve as vocal signal input and output means to the central processing unit 43 which is in turn in communication with the remote administrating and monitoring device 6 via the public telephone network 5. Thus, the remote administrating and monitoring device 6 may listen to what is happening at the subscriber's house (by means of the microphone MIC) and issue sound alarm or other vocal signal to the subscriber's house to for example warn the residents to leave in case of a fire. If desired, the central processing unit 43 or the remote administrating and monitoring device 6 may issue a MUTE signal to the speaker SPK to turn the speaker SPK off.

The central processing unit 43 or the remote administrating and monitoring device 6 may also be capable to issue a visual intercommunication signal VL to the control mode selection circuit 49 to provide the subscriber with a visual or non-visual intercommunication with the remote administrating and monitoring device via the video equipment 24 and/or the intercommunication facility 25. This allows the remote administrating and monitoring device 6 or the operators thereof to directly handle situations inside the user's house.

The remote administrating and monitoring device 6 may comprise decoding circuit, digital recording circuit, visual communication/intercommunication circuit, automatic dialing circuit, function switching circuit, memory and so on to perform desired operations. This, however, does not constitute any novel part of the present invention, so that detail will be neglected herein.

By means of the architecture described above, any subscriber's house may be connected, by means of automatic dialing operation, to a public telecom-network and from which emergency happening in the subscriber's house may be transmitted to the remote administrating and monitoring device which in turn notifies the associated personnel or government department (police station or fire station). The transmission of data or signal between the subscriber and the remote administrating and monitoring device may be done with regular coding process or it may be done with an enciphering process to maintain confidentiality of the transmitted information.

In accordance with the present invention, when the remote administrating and monitoring device 6 receives and interprets an emergency message transmitted from the subscriber, the remote administrating and monitoring device 6 may then issue control command to take direct control of the emergency handling/communication circuit 2 for activating any one of the alarm ring 21, speaker 22, microphone 23, video equipment 24 and intercommunication facility 25 coupled thereto for emergency handling purpose. At the same time, the remote administrating and monitoring device 6 notifies the related government department or the emergency handling members through the public telecom-network by means of the automatic dialing function thereof. This allows the emergency occurring in the subscriber's house to be handled timely and properly.

Although the preferred embodiment of the present invention has been described to illustrate the present invention, it is apparent that changes and modifications in the specifically described embodiment can be carried out without departing from the scope of the invention which is intended to be limited only by the appended claims.

What is claimed is:

1. A security system for a plurality of subscribers, comprising:
   a) a security device located in each of the plurality of subscribers, each security device comprising:
      i) a sensing circuit including at least one sensing element to generate a detection signal;
      ii) an emergency handling/communication circuit including at least one alarm device; and
      iii) a monitor/control server including a central processing unit connected to the serving circuit to receive generated detection signals and to the emergency handling/communication circuit the central processing unit having a dual tone multi-frequency signal receiver enabling the central processing unit to be connected to a public telecom network in response to a ringing signal transmitted through the public telecom network and to receive a dual tone multi-frequency signal transmitted over the public telecom network, a dialing circuit for performing an automatic dialing operation, and a radio frequency receiver;
   b) a remotely located administrating and monitoring device connected to each of the monitor/control servers via the public telecom network to selectively communicate with the monitor/central servers; and,
   c) a remote setting unit communicating with at least one monitor/central servers via radio frequency so as to control the operation of the at least one monitor/control server.

2. The security system as claimed in claim 1, wherein the central processing unit further comprises a memory for data and software storage.

3. The security system as claimed in claim 1, wherein the emergency handling/communication circuit further comprises vocal and visual input and output devices controlled by the central processing unit to provide a visual and vocal communication between each of the plurality of subscribers and the remotely located administrating and monitoring device.

4. The security system as claimed in claim 3, wherein the central processing unit further comprises a control mode selection circuit.

5. The security system as claimed in claim 4, wherein the alarm device of the emergency handling/communication circuit is connected to the central processing unit via the selection circuit so that the central processing unit selectively activates the alarm in response to a control signal from the remote administrating and monitoring device.

6. The security system as claimed in claim 1, wherein the sensing circuit comprises at least one wireless sensing element in communication with the monitor/control server by radio frequency.

7. The security system as claimed in claim 1, wherein the sensing circuit comprises at least one cabled sensing element and the central processing unit further comprises an encoder circuit which receives and processes a signal from the cabled sensing element to provide a BCD code applicable to the central processing unit.

8. The security system as claimed in claim 1, wherein the dual tone multi-frequency signal receiver has a ring detection circuit which detects a ringing signal from the public telecom-network.

\* \* \* \* \*